(12) United States Patent
Wittrisch et al.

(10) Patent No.: US 10,190,494 B2
(45) Date of Patent: Jan. 29, 2019

(54) SYSTEM AND METHOD FOR STORING ENERGY IN FORM OF COMPRESSED AIR IN TUBES INTEGRATED IN A TANK CONTAINING WATER AND WATER VAPOUR

(71) Applicant: IFP Energies nouvelles, Rueil-Malmasion (FR)

(72) Inventors: Christian Wittrisch, Rueil Malmaison (FR); Michel Constant, Montmorency (FR)

(73) Assignee: IFP ENERGIES NOUVELLES, Rueil-Malmasion (FR)

( * ) Notice: Subject to any disclaimer, the term of this patent is extended or adjusted under 35 U.S.C. 154(b) by 99 days.

(21) Appl. No.: 15/013,256

(22) Filed: Feb. 2, 2016

(65) Prior Publication Data

US 2016/0222881 A1      Aug. 4, 2016

(30) Foreign Application Priority Data

Feb. 2, 2015   (FR) ...................................... 15 50786

(51) Int. Cl.
| | | |
|---|---|---|
| F02C 1/02 | (2006.01) | |
| F01K 3/00 | (2006.01) | |
| F01K 7/30 | (2006.01) | |
| F22B 1/18 | (2006.01) | |
| F01K 13/00 | (2006.01) | |
| F22B 1/02 | (2006.01) | |
| F01K 25/04 | (2006.01) | |

(52) U.S. Cl.
CPC .................. *F02C 1/02* (2013.01); *F01K 3/00* (2013.01); *F01K 7/30* (2013.01); *F01K 13/00* (2013.01); *F01K 25/04* (2013.01); *F22B 1/028* (2013.01); *F22B 1/18* (2013.01)

(58) Field of Classification Search
CPC ...... F02C 1/02; F01K 3/00; F01K 7/30; F01K 25/04; F01K 13/00; F22B 1/18; F22B 1/028
USPC ................................... 60/650, 659, 682–684
See application file for complete search history.

(56) References Cited

U.S. PATENT DOCUMENTS

| | | | |
|---|---|---|---|
| 4,100,745 A | 7/1978 | Gyarmathy et al. | |
| 4,224,798 A * | 9/1980 | Brinkerhoff | ............ F01B 29/08 417/228 |
| 8,136,354 B2 * | 3/2012 | Havel | ........................ F01K 3/00 60/412 |

(Continued)

FOREIGN PATENT DOCUMENTS

DE     10 2010 033956 A1     1/2012

OTHER PUBLICATIONS

Preliminary Search Report for French Application No. 15/50.786 dated Nov. 25, 2015.

*Primary Examiner* — Hoang Nguyen

(74) *Attorney, Agent, or Firm* — Fitch, Even, Tabin & Flannery LLP

(57) ABSTRACT

The present invention relates to a system and to a method for storing energy in form of compressed air, having an assembly of connected tubes forming a storage volume, which are confined in a pressure-resistant thermally-insulating tank. The storage system according to the invention comprises a system for storing and releasing the heat of the compressed air to increase the storage system efficiency.

20 Claims, 5 Drawing Sheets

(56) References Cited

U.S. PATENT DOCUMENTS

| | | | | |
|---|---|---|---|---|
| 8,671,686 | B2* | 3/2014 | Pinkerton | G06F 1/30 |
| | | | | 60/646 |
| 2011/0023488 | A1* | 2/2011 | Fong | F01K 25/06 |
| | | | | 60/659 |
| 2012/0042643 | A1* | 2/2012 | Lebas | F03B 13/06 |
| | | | | 60/413 |
| 2012/0324944 | A1 | 12/2012 | Dubettier-Grenier et al. | |
| 2014/0159371 | A1* | 6/2014 | Hugo | F03D 9/00 |
| | | | | 290/54 |
| 2015/0267612 | A1* | 9/2015 | Bannari | F01D 15/02 |
| | | | | 60/650 |

* cited by examiner

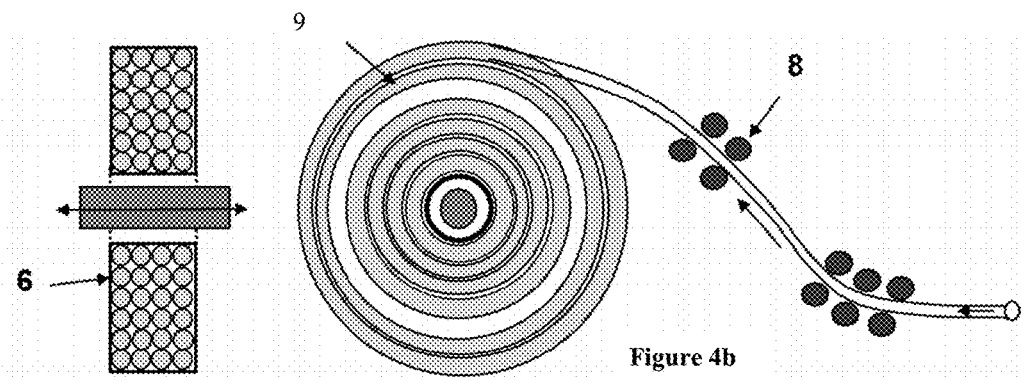
Figure 4a
Figure 4b
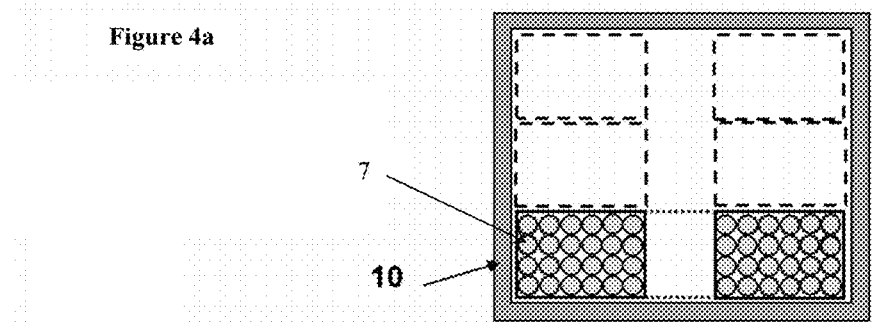
Figure 4c
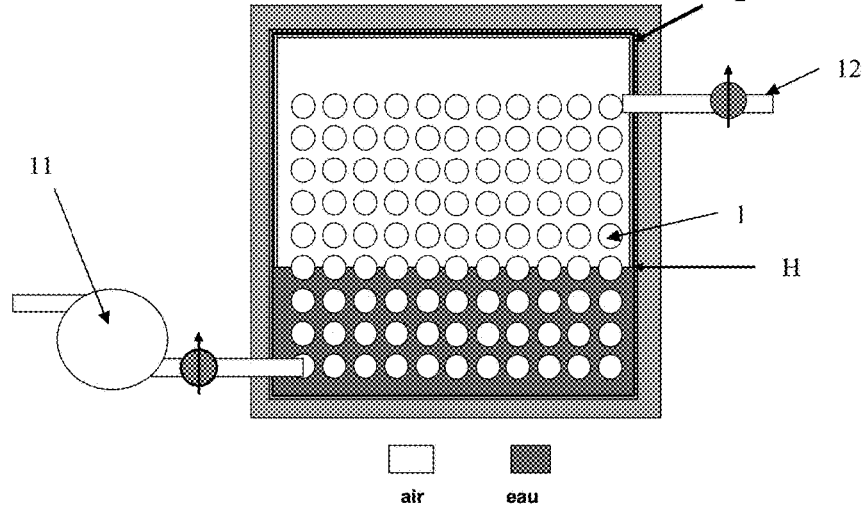
air    eau
Figure 5

SYSTEM AND METHOD FOR STORING ENERGY IN FORM OF COMPRESSED AIR IN TUBES INTEGRATED IN A TANK CONTAINING WATER AND WATER VAPOUR

CROSS-REFERENCE TO RELATED APPLICATIONS

This application claims priority from French Patent Application Number 15/50.786, filed Feb. 2, 2015, which is hereby incorporated herein by reference in its entirety.

BACKGROUND OF THE INVENTION

Field of the Invention

The field of the present invention concerns compressed air energy storage (CAES) and relates to an optimized air storage system. In this system, the energy that may come from electricity notably generated from renewable sources and that is intended for use at another time than the time of production can be stored in the form of compressed air. The excess electricity produced is therefore fed into one or more compressors whose purpose is to compress a given amount of air and to store it in suitable tanks.

Description of the Prior Art

To date there is no semi-massive local storage of industrial compressed air, in artificial reservoirs (unlike existing geological storages in saline cavities), between 70 and 120 bars for volumes ranging between 1000 $m^3$ and 30,000 $m^3$ are installed on the land surface and sub-surface (hereafter referred to as "mini CAES").

Furthermore, with the current solutions, it is not always possible to store the heat energy of the compressed air, which results in energy losses of the energy storage systems.

SUMMARY OF THE INVENTION

The present invention concerns a system for storing energy in the form of compressed air, having an assembly of connected tubes forming a storage volume; which is confined in a pressure-resistant thermally-insulating tank. The storage system according to the invention comprises storing and releasing the heat energy of the compressed air to increase the storage system efficiency.

The invention concerns a system for storing energy as compressed air, comprising at least one tube forming a storage volume, which is confined in a sealed pressure-resistant thermally-insulating tank. The system for storing energy as compressed air stores and releases the heat of the compressed air comprising water and/or water vapor.

According to the invention, the tube is made of metal and notably may be steel.

Advantageously, the water and the water vapor of the heat storage and release occupy at least partly an inner space of the tank.

According to one embodiment of the invention, the storage system comprises an assembly of connected tubes forming the storage volume, comprising straight tubes joined in bundles and arranged in parallel.

Alternatively, the storage system comprises an assembly of connected tubes forming the storage volume, which is arranged as a tube coil.

According to an aspect of the invention, the storage system is either on the surface or it is at least partially buried.

Advantageously, the tubes are arranged substantially horizontal.

According to a feature of the invention, the system comprises a secondary heat exchanger for heating the heat storage and release.

Furthermore, the system can comprise a heat source which is external to the tank for heating the heat storage and release.

According to a variant embodiment of the invention, the system comprises a tertiary heat exchanger for heating the storage volume.

Preferably, the tank is a closed concrete shell provided with a thermally insulating coating.

Furthermore, the invention relates to a method for storing and recovering energy which uses compressed air, wherein the following stages are carried out:
 a) compressing the air,
 b) storing the compressed air in a storage system as described above, and
 c) expanding the stored air to generate energy.

According to one embodiment, the stored air is heated prior to stage c).

Advantageously, energy is generated by at least one turbine.

BRIEF DESCRIPTION OF THE DRAWINGS

Other features and advantages of the method according to the invention will be clear from reading the description hereafter of embodiments given by way of non-limitative example, with reference to the accompanying figures wherein:

FIG. 5 illustrates a storage system according to one embodiment of the invention prior to the compressed air filling stage.

DETAILED DESCRIPTION OF THE INVENTION

Figure 1:
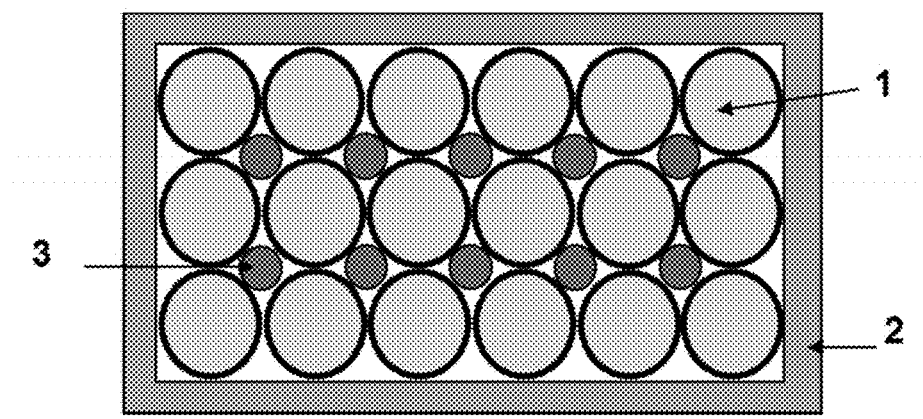
FIG. 1 schematically shows a cross-sectional view of an assembly of straight steel tubes arranged in "bundles" in an insulating shell.

According to the invention, the air under high pressure (compressed air), between 70 and 120 bars for example, is stored in at least one tube, notably made of metal, preferably steel. Steel tubes are suitable because they need to withstand the pressure of several hundred bars and have the highest possible thermal conductivity. In the case of a storage using a plurality of tubes, the tubes are connected and form an assembly of tubes. The assembly of tubes makes up a compressed air storage volume. This assembly of tubes is confined in a sealed pressure-resistant thermally-insulating tank. The pressure resistance allows containing the water vapor which is used, as described in the description below. The thermal insulation notably prevents heat losses to the outside. For example, the tank can comprise a sealed shell which withstands the inside pressure and which limits heat loss to the outside environment. The thermally insulating shell can be arranged at the surface or can be at least partially buried (i.e. half buried) to benefit from a more temperature stable environment and/or for esthetic, environmental and safety reasons. In the rest of the description, the expression "assembly of tubes" also relates to the embodiment where storage is achieved with a single tube.

These tubes can be protected against external corrosion by means of polyolefin, polyethylene (PE) and polypropylene (PP) coatings, and against inside corrosion by means of epoxy coatings.

According to an embodiment of the invention, metal tubes are preferably used, are assembled by welding and are arranged horizontally, in bundles, at the surface. The tubes, made of steel for example, are preferably arranged horizontally for greater ease of assembly over a greater length and for reducing the number of end plugs and of connections between tubes.

To construct the storage system, it is possible to use preferably "seamless" oil pipes (of tubing or casing type), or straight welded tubes using longitudinal or helical welding used for gas pipelines, within the limits of their working pressure.

The tubes, which advantageously are single 12-15 meter elements, are preferably assembled and welded at the storage site, with limited handling.

The tube lengths can reach several tens of meters depending on the desired air volume and on the room available on the storage site. The tubes thus formed are arranged parallel to one another along their axes, then in successive layers to make up a "bundle" of, for example, about 10 tubes per row with about 10 tubes on top of one another, to obtain one hundred tubes. A bundle is understood to be a pile of several rows of tubes, each row comprising a plurality of tubes.

The tubes are connected to one another by pipes of suitable diameter enabling their connection, in parallel or in series, for obtaining the desired storage volume. A set of valves on these pipes allows a tube or an assembly of tubes to be isolated.

The "bundle" formed is preferably quasi-horizontal, with however a slight slope to facilitate the flow of condensates.

The tubes are preferably arranged horizontally rather than vertically. Horizontally, allows a greater storage volume with a minimum number of connecting pipes and tube end plugs, which unlike the vertical half-buried arrangement involves a tube length which is limited to the excavation depth. The multiplication of vertical tubes increases the number of end plugs, complicates connections and increases the cost of the plant.

Example of Orders of Magnitude:

For a steel tube of 20" (0.508 m) outside diameter, 0.485 m inside diameter and 10 m in length, and for a bundle of 10×10=100 tubes, the weight is 137 tons for a compressed air volume of 185 $m^3$, which gives a $m^3$ of air/tons of steel ratio of 1.348, or the ratio of 0.742 tons of steel/$m^3$ stored. This calculation does not take account for the tube end plugs and the connects between them. Therefore, the rule recommending "one kilo of steel per liter of compressed air stored" can be applied.

In a variant according to the invention, if the stored air is hot (heat from the compression stage), the goal is to keep the heat of the compressed air in the storage tubes as long as possible. The tank containing the assembled straight tube bundles is therefore thermally insulated from the outside environment keeping the heat of the compressed air fed into the storage.

FIG. 1 is a cross-sectional view of a bundle made up of parallel tubes 1 confined in an enclosure 2 (i.e. an insulated pressure-resistant tank) for thermal insulation, environmental and/or safety reasons.

Additional heating of the air contained in horizontal straight tubes can be achieved internally in or externally from the storage tube.

It is possible to provide in each storage tube a tube referred to as "insert", filled with a heat storage material.

Figure 2:
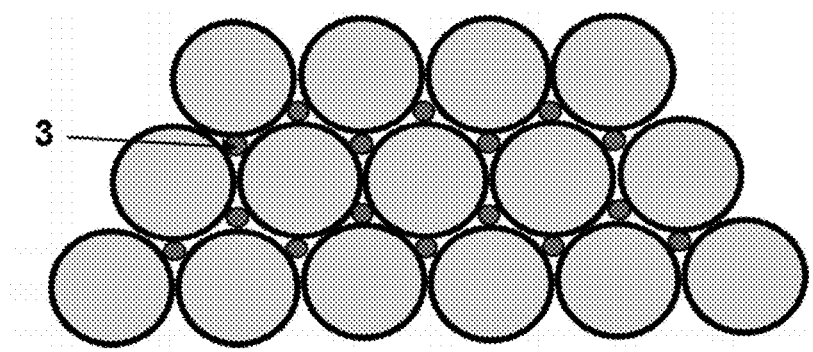
FIG. 2 shows an arrangement of heating and/or heat recovery pipes.

Another variant uses a heat exchanger made up of pipes 3 arranged in the space available between the compressed air storage tubes. The tubes are preferably in metal-metal contact to facilitate heat transfer by conduction. FIG. 2 shows another arrangement for the parallel tubes and heat exchange pipes 3.

Heating or maintaining the temperature of the compressed air contained in the storage tube is achieved through circulation of a hot fluid (vapor or a heat-carrying liquid) that exchanges, by thermal conductivity of the steel between the two types of tube (compressed air tubes and hot fluid pipe), heat with the stored compressed air.

Another embodiment of the compressed gas storage has steel tube formed into coils. The coils are preferably, but not necessarily, formed on the site due to their size, dimensions of the coils, weight and the handling devices for the tubes which are available.

Figure 3:
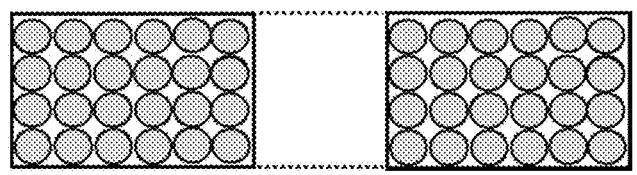
FIG. 3 illustrates an example of dimensioning storage coils according to the invention, FIGS. 4a to 4c schematically show embodiments of vertical-axis and horizontal-axis coils and coil assembly arrangements.

Manufacturing of a unitary coil can be achieved by winding the steel tube, through plastic deformation thereof or, providing successive layers around a drum of horizontal or vertical axis. FIG. 3 shows a section along a diameter of a coil.

Preferably, the axis of the coil is vertical.

Example of Orders of Magnitude:

A unitary storage coil of 15 m maximum diameter, 3 m minimum diameter, 1.5 m in width, with a steel tube of 6.625" (16 cm) diameter, 6.4 mm thickness, has a steel weight of 230 tons, and a gas storage volume of 176 $m^3$. The volume of the cylinder made up of such an elementary coil is 276 $m^3$.

FIGS. 4b and 4c schematically show a horizontal-axis coil 6 and an assembly of vertical-axis coils 7.

As illustrated in FIG. 4a, the coils can be made from standard steel tube sections of 12-15 m individual length, assembled and welded to form a continuous tube that is subsequently subjected to plastic bending by pinch rolls 8 and wound on a specific drum 9 to form an elementary coil, with a volume of 276 $m^3$ for example.

Several unitary coils can be superposed and interconnected by pipes so as to make up a storage volume in a tank (FIG. 4c).

The dimension of the manufactured coil and therefore the weight thereof is directly depending on the lifting capacity on the mini CAES site. Each coil element can be manufactured on site, hooped and turned over to switch from a vertical coil (with its horizontal axis) to a horizontal coil (with its vertical axis), then positioned, lowered and laid flat in the bottom of previously built tank 10 (FIG. 4).

An excavation can be dug to contain the lower half of the drum, in order to avoid an overhead structure and to facilitate winding of the continuous tube.

A gantry compatible with the loads and dimensions of the coil (for example 15 m in outside diameter, 3 m in height and a coil weight of 230 tons) allows the coil to be tipped over, moved and lowered into the tank.

It will be possible to manufacture coil elements of smaller height (2 m for example) while keeping an acceptable outside diameter (15 m for example) to maintain the linear volume and to reduce the mass of the manufactured element.

The coil elements can thus be stacked on one another and connected by tubes, arranged in series or in parallel.

The compressed air storage tubes can be, upon construction of the coil, joined (contiguous spires) or spaced a few centimeters apart between each tube, so as to facilitate heat exchanges between the steel of the tube and the heat-carrying fluid if the air is stored hot.

According to the invention, in order to store the heat of the stored compressed air, the energy storage system comprises systems for storing and releasing the heat of the compressed air. The heat storage and release systems allow storing the heat of the compressed air during the storage stage because the compressed air is heated by the compression thereof. The heat storage and release allows releasing the heat stored upon withdrawal of the compressed air because the compressed air is cooled by the expansion thereof at the outlet of the hot compressed air storage system. This expansion of the hot stored compressed air can be achieved by of an expansion turbine or any other system, with pistons for example, allowing conversion of the stored energy to mechanical rotational or even electrical energy if the expansion system is coupled with an electric generator. Thus, the energy efficiency of the storage system is increased.

The heat storage and release system comprises water, in liquid and gas (water vapor) form, for storing the heat. During the storage stage, the water in liquid form vaporizes and, during the release stage, the water in vapor form condenses. Preferably, the water and the water vapor occupy at least partially the inner space of tank 2 provided with a thermally insulating shell. Advantageously, the water and the water vapor occupy the space between the tubes forming the compressed air storage volume. The heat transfer between the compressed air and the water vapor occurs directly, the thermal conduction of the material (metal for example) forming the tubes. The stored heat energy (or heat) depends on the sensible heat of the water (energy of the water at saturation temperature) increased by the latent heat (water vaporization energy). In the rest of the description and in the figures, the term "water" designates water in liquid form and the term "vapor" designates water in water vapor form.

Using water and water vapor allows obtaining a good thermal efficiency for the energy storage. Indeed, water vapor has physical properties that are particularly well suited for heat transfer; in particular, the latent heat thereof allows obtaining a good thermal efficiency. Furthermore, the heat storage and release cycles using water vapor can be rapid. Besides, water vapor can be used for a larger number of cycles than heat absorbing materials that degrade over time. Moreover, water affords the advantage of being chemically stable and inexpensive.

The tank is designed to withstand the water vapor pressure. For example, the tank can preferably be made of concrete internally and/or externally coated with a thermally insulating material. Thus, the tank can withstand high inside pressures (water vapor pressure) of about 10 bars for example and high temperatures (water vapor temperature) of about 180° C. for example. Alternatively, the sealed pressure-resistant tank can also be made of sheet steel or sheet steel externally reinforced by a concrete cover.

Figure 6:
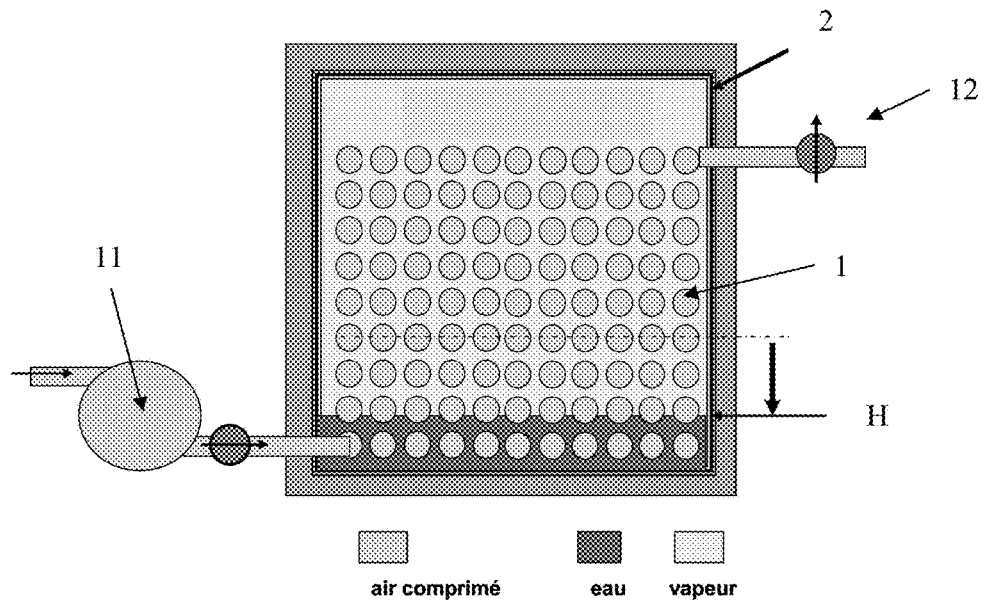
FIG. 6 illustrates the storage system of the embodiment of FIG. 5 during the compressed air filling stage.
Figure 7:
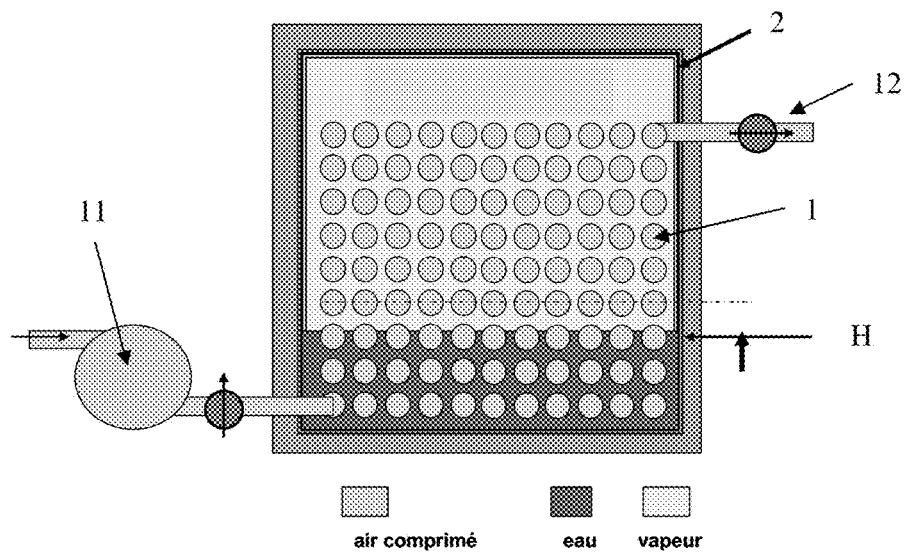
FIG. 7 illustrates the storage system of the embodiment of FIG. 5 during the compressed air withdrawal stage.

FIGS. 5 to 7 illustrate the same embodiment of the storage system according to the invention, respectively prior to compressed air filling of tubes 1 (FIG. 5), during compressed air filling of tubes 1 (FIG. 6) and during compressed air release (FIG. 7).

As illustrated in FIG. 5, tank 2 with its thermally insulating shell is initially partly filled with water, cold water for example, prior to filling tubes 1 with hot compressed air. The water occupies the lower part of the inner space of tank 2 between the assemblies of tubes 1, up to a height H. Tank 2 comprises in the lower part thereof compressed air delivery system 11 that can be connected (or provided) to a compression unit (or a compressor) and to at least one tube 1 of the assembly. Moreover, the tank 2 (the thermally insulating shell) comprises in the upper part thereof a compressed air discharge system 12 that can be connected to an expansion system (provided with an expansion valve) and to at least one tube 1 of the assembly. According to a variant embodiment that is not shown, the compressed air expansion system that converts the hot air compression energy to mechanical rotational energy can be an assembly made up of turbines or piston engines. The rotational energy produced can be converted to electrical energy by an electric generator.

According to the invention, the hot compressed air at the outlet of a compressor, which is at 400° C. for example, is stored in the storage volume made up of tubes 1. The heat or the heat energy entering tank 2 is provided by the hot compressed air through metal tubes 1. According to a variant embodiment of the invention, the compressor(s) is (are) arranged as close as possible to tank 2 to limit thermal losses in the tubes outside the tank. As illustrated in FIG. 6, the lower part of tank 2 is initially filled with water in which tubes 1 of the assembly are partially immersed. Due to the heat supplied, the water progressively vaporizes until a water-vapor medium in phase equilibrium depending on the pressure and temperature of the medium is obtained. Thus, the temperature and the pressure of the water and vapour phases increase. In tank 2, the vapor volume increases and the water volume decreases (water height H decreases) until complete thermal energy charge of tank 2 that is limited by the maximum vapor pressure allowed by storage tank 2.

During the stage of withdrawing compressed air from the tubes, according to the ideal gas law (of Amontons, who specifies that, "for a constant volume of a gas, the pressure varies when the temperature changes"), decompression of the air in the constant volume of the tubes produces a decrease in the temperature of the stored air. The air temperature decrease is compensated by the heat supplied by the vapor under pressure and the previously stored water. The vapor yields the latent heat thereof and possibly a small part of the sensible heat of the water. The condensates return to the tank as water. The water volume in the tank does therefore not vary during the vaporization-condensation cycle since the vapor is not vented to atmosphere. As illustrated in FIG. 7, during the compressed air withdrawal stage, water height H increases in tank 2.

According to a variant embodiment of the invention, the energy storage system (in form of hot compressed air) can comprise an external heat source for increasing the heat storage in the tank and for compensating, notably in case of long-term storage, the losses due to imperfect insulation. For example, the energy storage system can comprise a vapor accumulator arranged outside the compressed air storage system. Injecting vapor at sufficient pressure and temperature into the tank increases the heat storage in the tank. For this variant embodiment, the volume of water in the tank at the end of the compressed air withdrawal stage has increased in relation to the water volume initially present in the tank. This water volume depends on the amount of vapour injected. This water vapor reserve can be waste vapor or water vapor created from the combustion of fossil energy (by means of a burner for example), "stray" heat from the industry (refining, iron and steel industry, etc.), household waste incinerators, or intermittent energy (wind or solar energy for example). The tank accumulating the heat from an external source can be arranged at the surface or at least partially buried.

Figure 8:
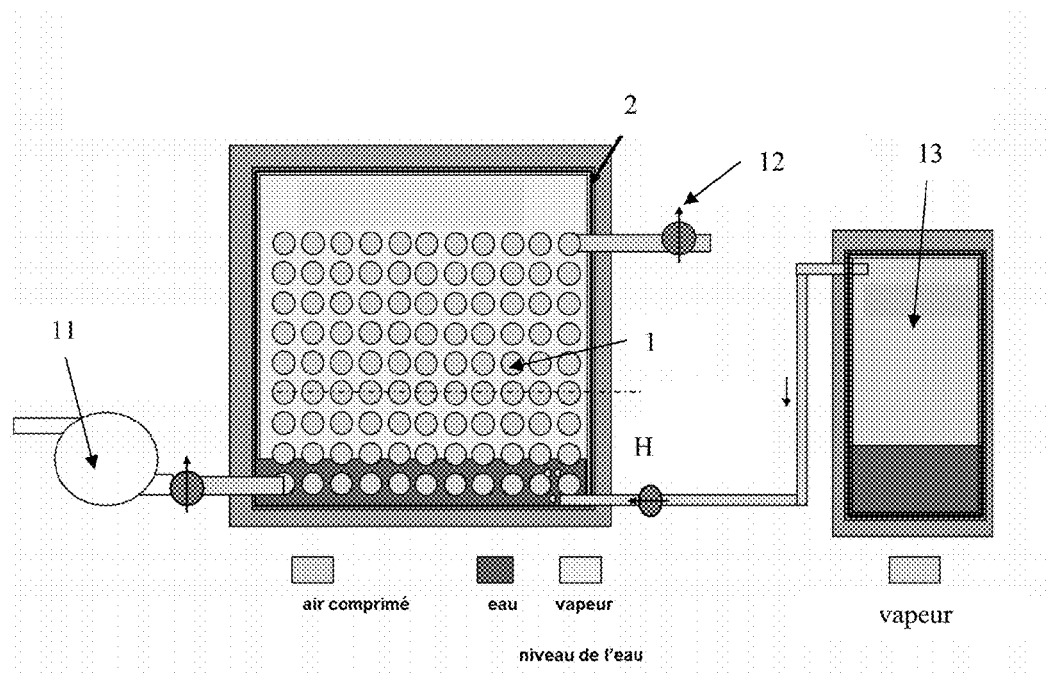
FIG. 8 illustrates a first variant of the storage system with an external heat source, during the compressed air heating stage.

FIG. 8 illustrates an example of this variant embodiment during the compressed air storage stage. The inner space of tank 2 is connected to a heat accumulator tank 13. Tank 13 comprises water and water vapour. The water vapour of tank 13 is directly injected into the water of tank 2, preferably at the base thereof, which is filled with water. Heat accumulator tank 13 allows the storage of heat in tank 2 to be increased. FIG. 8 also illustrates the compressed air delivery 11 and discharge 12.

According to a variant embodiment of the invention, the energy storage system can comprise an exchanger for heat exchange between the water contained in tank 2 and a heat-carrying fluid. This heat exchanger is referred to as secondary heat exchanger. The secondary heat exchanger is arranged in the tank, mainly in the lower part thereof. It is at least partially immersed in the water. This secondary heat exchanger can be an assembly of tubes in which the liquid heat-carrying fluid circulates. The secondary heat exchanger allows the water to be heated, which allows the heat storage in the tank to be increased.

Figure 9:
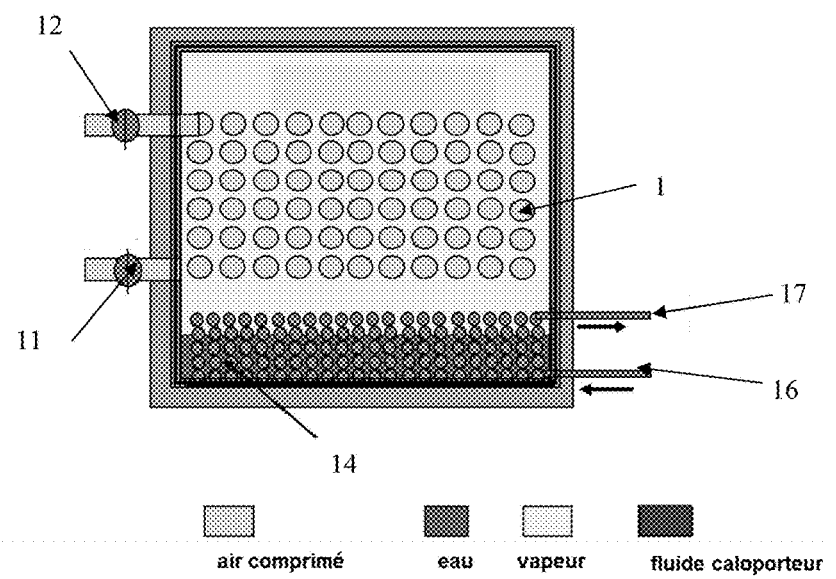
FIG. 9 illustrates a second variant of the storage system with a secondary heat exchanger, during the compressed air heating stage.

FIG. 9 illustrates an example of this variant embodiment during the compressed air storage stage. The lower part of tank 2, which is free of tubes 1, comprises a secondary heat exchanger 14. A hot heat-carrying fluid (preferably always in the liquid phase) circulates in secondary heat exchanger 14 through an inlet 16 and an outlet 17 which heats the water contained in tank 2. FIG. 9 also illustrates the compressed air delivery 11 and discharge 12.

According to a variant embodiment of the invention, the energy storage system can comprise an exchanger for heat exchange between the compressed air and a heat-carrying fluid. This heat exchanger allows heating the compressed air storage volume, i.e. the tubes. This heat exchanger is referred to as tertiary heat exchanger. The tertiary heat exchanger can be internal to the tubes and it can come in form of "inserts" within the tubes in which the heat-carrying fluid circulates. This tertiary exchanger allows the compressed air to be directly heated, which allows the thermal efficiency of the energy storage to be increased.

Figure 10:
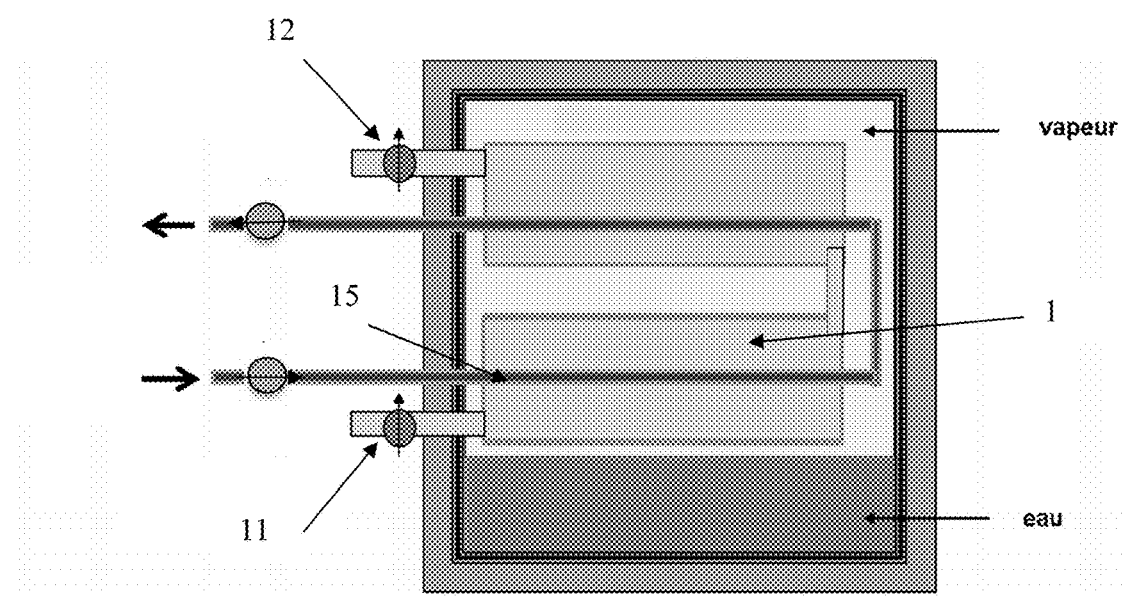
FIG. 10 illustrates a third variant of the storage system with a tertiary heat exchanger, during the compressed air heating stage.

FIG. 10 illustrates an example of this variant embodiment. For figure readability reasons, FIG. 10 is represented in a direction perpendicular to the direction of FIGS. 5 to 9. Furthermore, only two tubes 1 are shown. An insert is arranged within tubes 1. The insert comprises a tertiary heat exchanger 15 in which a hot heat-carrying fluid that directly heats the compressed air stored in tubes 1 circulates. FIG. 10 also illustrates the compressed air delivery 11 and discharge 12 means.

Besides, according to a variant embodiment, the energy storage system can comprise a tertiary heat exchanger external to the tubes for heating the stored compressed air. FIGS. 1 and 2 illustrate such heat exchangers 3.

According to another variant embodiment that is not shown, a burner can also be provided as the external heat source.

FIGS. 5 to 10 illustrate by way of non: limitative example several embodiments of the storage system according to the invention in cases where the assembly of tubes comprises straight tubes arranged in bundles. However, these embodiments are also suited in the case of tube assemblies arranged in form of coils, as illustrated in FIGS. 3 and 4.

The various embodiments can be combined. For example, the energy storage system can comprise both an external heat source, a secondary heat exchanger and a tertiary heat exchanger.

The invention furthermore relates to an energy storage and recovery method using compressed air. The method implements a storage system as described above. During the process, the following stages are carried out:
compressing air, notably using compressors,
storing the compressed air in the tubes of the storage system as described above,
expanding the stored compressed air contained in the tubes to generate energy, notably mechanical or electrical energy, by a turbine.

The method can also involve a stage of heating the stored compressed air by the storage systems according to the embodiments of FIGS. 8 to 10.

The invention claimed is:

1. A system for storing energy in compressed air, water and water vapor comprising:
at least one tube providing a storage volume for the compressed air, water and vapor water, the tube being confined in a sealed pressurized pressure-resistant thermally-insulated tank, means for storing and releasing heat in the compressed air stored in the storage volume and the sealed pressurized pressure-resistant thermally insulated tank includes compressed air, water and water vapor which during heat storage progressively vaporizes until a water-vapor medium in phase equilibrium occurs in the tank which depends on pressure and temperature in the tank.

2. A system as recited in claim 1, wherein the at least one tube is metallic.

3. A system as recited in claim 1, wherein the water and water vapor occupies at least part of an inner space of the tank.

4. A system as recited in claim 1, wherein the at least one task includes connected straight tubes joined in bundles and arranged in parallel.

5. A system as recited in claim 1, wherein the storage volume comprises a tube in a coil.

6. A system as recited in claim 1, wherein the storage is disposed on either a ground surface or at least partially buried below the ground surface.

7. A system as recited in claim 1, wherein at least one tube is substantially horizontal.

8. A system as recited in claim 1, comprising a secondary heat exchanger for heating the means for storing and releasing heat.

9. A system as recited in claim 1, comprising a heat source external to the tank for heating the means for heating and releasing.

10. A system as recited in claim 1 comprising a tertiary heat exchanges for heating the storage volume.

11. A system as recited in claim 1, wherein the tank consists of a closed concrete shell having a thermal insulation coating.

12. A system as recited in claim 2, wherein the water and water vapor occupies at least part of an inner space of the tank.

13. A system as recited in claim 2, wherein the at least one tube includes connected straight tubes joined in bundles and arranged in parallel.

14. A system as recited in claim 3, wherein the at least one tube includes connected straight tubes joined in bundles and arranged in parallel.

15. A system as recited in claim 4, wherein the at least one tube includes connected straight tubes joined in bundles and arranged in parallel.

16. A system as recited in claim 3, wherein the storage volume comprises a tube in a coil.

17. A system as recited in claim 4, wherein the storage volume comprises a tube in a coil.

18. A method for storing and recovering energy from compressed air, water and water vapor in at least one tube providing a storage volume for the compressed air, water and water vapor, the tube being confined in a sealed pressurized pressure-resistant thermally-insulated tank, means for storing and releasing heat in the compressed air, water and water vapor stored in the tube and the compressed air including water and water vapor comprising:
   a) compressing the air, water and water vapor;
   b) storing the compressed air, water and water vapor in the storage volume; and
   c) expanding the compressed air from within the storage volume to generate energy; and wherein
   the water during energy storage progressively vaporizes until a water-vapor medium in phase equilibrium occurs which depends on pressure and temperature in the tank.

19. A method as recited in claim 18 comprising:
heating the compressed air prior to performing step c).

20. A method as claimed in claim 18, comprising:
generating electrical energy with at least one turbine.

\* \* \* \* \*